(12) United States Patent
Cui

(10) Patent No.: US 10,632,872 B2
(45) Date of Patent: Apr. 28, 2020

(54) ADJUSTABLE CHILD DEVICE

(71) Applicant: Wonderland Switzerland AG, Steinhausen (CH)

(72) Inventor: Zong-Wang Cui, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/594,068

(22) Filed: Oct. 6, 2019

(65) Prior Publication Data

US 2020/0031254 A1 Jan. 30, 2020

Related U.S. Application Data

(62) Division of application No. 15/825,075, filed on Nov. 28, 2017.

(51) Int. Cl.
*B60N 2/28* (2006.01)
*B60N 2/30* (2006.01)

(52) U.S. Cl.
CPC ......... *B60N 2/2866* (2013.01); *B60N 2/2812* (2013.01); *B60N 2/3045* (2013.01); *B60N 2/3097* (2013.01); *B60N 2/2881* (2013.01); *B60N 2002/2815* (2013.01); *B60N 2002/2896* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,268,054 A | * | 5/1981 | Twitchell | A61G 5/00 188/2 F |
| 4,521,052 A | * | 6/1985 | Cone | A47D 1/103 297/3 |
| 5,384,946 A | | 1/1995 | Sundstedt | |
| 6,491,343 B2 | * | 12/2002 | Yamazaki | B60N 2/062 297/250.1 |
| 6,908,151 B2 | | 6/2005 | Meeker | |
| 7,374,241 B2 | * | 5/2008 | Gold | A47D 1/02 297/255 |

(Continued)

FOREIGN PATENT DOCUMENTS

| | | |
|---|---|---|
| CN | 106627276 A | 5/2017 |
| DE | 93 12 751 U1 | 1/1995 |

(Continued)

*Primary Examiner* — Sarah B Mcpartlin
(74) *Attorney, Agent, or Firm* — Winston Hsu

(57) ABSTRACT

An adjustable child device includes a first seat portion, a second seat portion and a belt engaging element. The second seat portion is foldable relative to the first seat portion between a folded position and an unfolded position and is at least partially received in the chamber when the second seat portion is located at the folded position. The second seat portion and the first seat portion are located on a horizontal plane to form a seat part when the second seat portion is located at the unfolded position. The belt engaging element is installed on a lateral side of the seat part and concurrently rotates from a stowed position to a use position when the second seat portion is unfolded from the folded position to the unfolded position. The adjustable child device can be folded when it is not in use, which saves storage space.

19 Claims, 20 Drawing Sheets

(56) References Cited

U.S. PATENT DOCUMENTS

| | | | |
|---|---|---|---|
| 8,870,284 B2* | 10/2014 | Chapman | B60N 2/265 |
| | | | 297/256.11 |
| 2004/0124677 A1 | 7/2004 | Meeker | |
| 2010/0176631 A1 | 7/2010 | Ogle | |
| 2010/0176635 A1* | 7/2010 | Glance | B60N 2/2866 |
| | | | 297/255 |
| 2013/0200671 A1* | 8/2013 | Herzberg | B60N 2/28 |
| | | | 297/250.1 |
| 2016/0264025 A1 | 9/2016 | Sumroy | |
| 2018/0050615 A1* | 2/2018 | Genoway | B60N 2/2866 |

FOREIGN PATENT DOCUMENTS

| | | |
|---|---|---|
| FR | 2 990 900 A1 | 11/2013 |
| JP | 2003-104102 A | 4/2003 |
| WO | 2018/079934 A1 | 5/2018 |

* cited by examiner

US 10,632,872 B2

ADJUSTABLE CHILD DEVICE

CROSS REFERENCE TO RELATED APPLICATIONS

This is a divisional application of U.S. patent application Ser. No. 15/825,075, filed on Nov. 28, 2017, the entire contents of which are incorporated herein by reference.

BACKGROUND OF THE INVENTION

1. Field of the Invention

The present invention relates to an adjustable child device, and more particularly, to an adjustable child device which can be folded to save storage space when it is not in use.

2. Description of the Prior Art

An adjustable child device is specifically designed for keeping a child safe when the child travels in a vehicle. An adjustable child device adapted for an elder child usually includes a seat and a belt engaging element but does not include a back rest. The adjustable child device can be fixedly connected to a car seat directly by a connection of a seat belt receptacle and a seat belt strap wrapping over the child's shoulder and waist and passing through the belt engaging element. However, such adjustable child device is bulky and cannot be folded, which occupies large storage space when it is not in use.

Therefore, there is a need to provide an adjustable child device having simple structure and capable of saving storage space.

SUMMARY OF THE INVENTION

An objective of the present invention is to provide an adjustable child device which can be folded to save storage space when it is not in use.

In order to achieve the aforementioned objective, the present invention discloses an adjustable child device. The adjustable child device includes a first seat portion, a second seat portion and a belt engaging element. A chamber is formed within the first seat portion. The second seat portion is foldable relative to the first seat portion. The second seat portion is at least partially received in the chamber when the second seat portion is folded relative to the first seat portion to a folded position, and the second seat portion and the first seat portion are located on a horizontal plane to form a seat part when the second seat portion is unfolded relative to the first seat portion to an unfolded position. The belt engaging element is installed on a lateral side of the seat part. The belt engaging element concurrently rotates from a stowed position to a use position when the second seat portion is unfolded relative to the first seat portion from the folded position to the unfolded position.

Preferably, according to an embodiment of the present invention, the adjustable child device further includes a mounting hub formed on the lateral side of the seat part and a shaft pin, and the belt engaging element is connected to the mounting hub by the shaft pin.

Preferably, according to an embodiment of the present invention, the adjustable child device further includes a supporting component disposed on a bottom of the second seat portion, and the supporting component is made of soft material.

Preferably, according to an embodiment of the present invention, the adjustable child device further includes a soft cloth covering the first seat portion and the second seat portion.

Preferably, according to an embodiment of the present invention, the adjustable child device further includes a tie-down strap for fastening the first seat portion and the second seat portion when the second seat portion is at the folded position.

Preferably, according to an embodiment of the present invention, a plurality of ventilation openings is formed on a top of the first seat portion and a top of the second seat portion.

Preferably, according to an embodiment of the present invention, the adjustable child device further includes a pivoting shaft. A rear end of the first seat portion is pivoted to a front end of the second seat portion by the pivoting shaft, and the belt engaging element is rotatably connected to the lateral side of the seat part by the pivoting shaft.

Preferably, according to an embodiment of the present invention, the first seat portion includes a first connecting assembly. The first connecting assembly includes a central through hole part, a gear, at least one receiving slot part and at least one driven wheel. The gear is disposed on the central through hole part and connected to the front end of the second seat portion. The at least one receiving slot part is located outside the gear, and an outer periphery of the at least one driven wheel interferes with an outer periphery of the gear.

Preferably, according to an embodiment of the present invention, the belt engaging element includes a mounting portion and an inner gear. The mounting portion is connected to the first connecting assembly. A periphery of the mounting portion is received in the at least one receiving slot part, and the inner gear is disposed on an inner periphery of the mounting portion for interfering with the outer periphery of the at least one driven wheel.

Preferably, according to an embodiment of the present invention, at least one restraining protrusion is formed on the mounting portion and movably received within the at least one receiving slot part.

Preferably, according to an embodiment of the present invention, a moving route of the at least one restraining protrusion is formed in an arc shape, and a moving range of the moving route is equal to or less than 90 degrees.

Preferably, according to an embodiment of the present invention, the second seat portion includes a second connecting assembly fixedly connected to the gear.

Preferably, according to an embodiment of the present invention, a fixing recess is formed on the second connecting assembly, and a fixing protrusion is formed on an end of the gear for engaging with the fixing recess.

In order to achieve the aforementioned objective, the present invention discloses an adjustable child device. The adjustable child device includes a first seat portion, a pivoting shaft, a second seat portion and a belt engaging element. The first seat portion includes a first connecting assembly. The first connecting assembly includes a central through hole part, a gear, at least one receiving slot part and at least one driven wheel. The gear is disposed on the central through hole part and connected to the front end of the second seat portion. The at least one receiving slot part is located outside the gear, and an outer periphery of the at least one driven wheel interferes with an outer periphery of the gear. A rear end of the first seat portion is pivoted to a front end of the second seat portion by the pivoting shaft. The second seat portion and the first seat portion are located on a horizontal plane to form a seat part when the second seat portion is unfolded relative to the first seat portion to an unfolded position. The belt engaging element is rotatably connected to the lateral side of the seat part by the pivoting shaft and driven to rotate by a pivoting movement of the second seat portion relative to the first seat portion.

Preferably, according to an embodiment of the present invention, the belt engaging element includes a mounting portion and an inner gear. The mounting portion is connected to the first connecting assembly. A periphery of the mounting portion is received in the at least one receiving slot part, and the inner gear is disposed on an inner periphery of the mounting portion for interfering with the outer periphery of the at least one driven wheel.

Preferably, according to an embodiment of the present invention, at least one restraining protrusion is formed on the mounting portion and movably received within the at least one receiving slot part.

Preferably, according to an embodiment of the present invention, a moving route of the at least one restraining protrusion is formed in an arc shape, and a moving range of the moving route is equal to or less than 90 degrees.

Preferably, according to an embodiment of the present invention, the second seat portion includes a second connecting assembly fixedly connected to the gear.

Preferably, according to an embodiment of the present invention, a fixing recess is formed on the second connecting assembly, and a fixing protrusion is formed on an end of the gear for engaging with the fixing recess.

In summary, the present invention utilizes the first seat portion, the second seat portion and the belt engaging element pivoted to one another, so that the second seat portion and the belt engaging element can be folded relative to the first seat portion when the adjustable child device is not in use. Therefore, the adjustable child device has a small storage size, which saves storage space.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
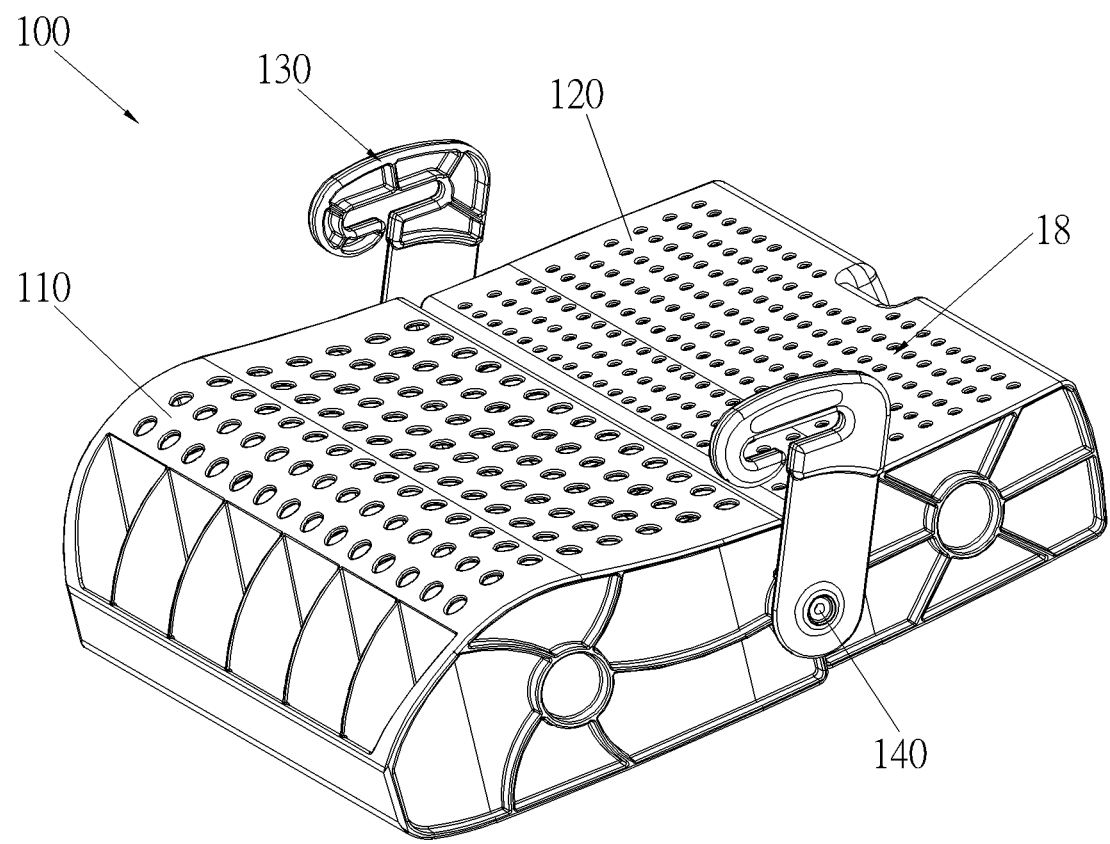
FIG. 1 and FIG. 2 are schematic diagrams of an adjustable child device in an unfolded state at different views according to a first embodiment of the present invention.
Figure 2:
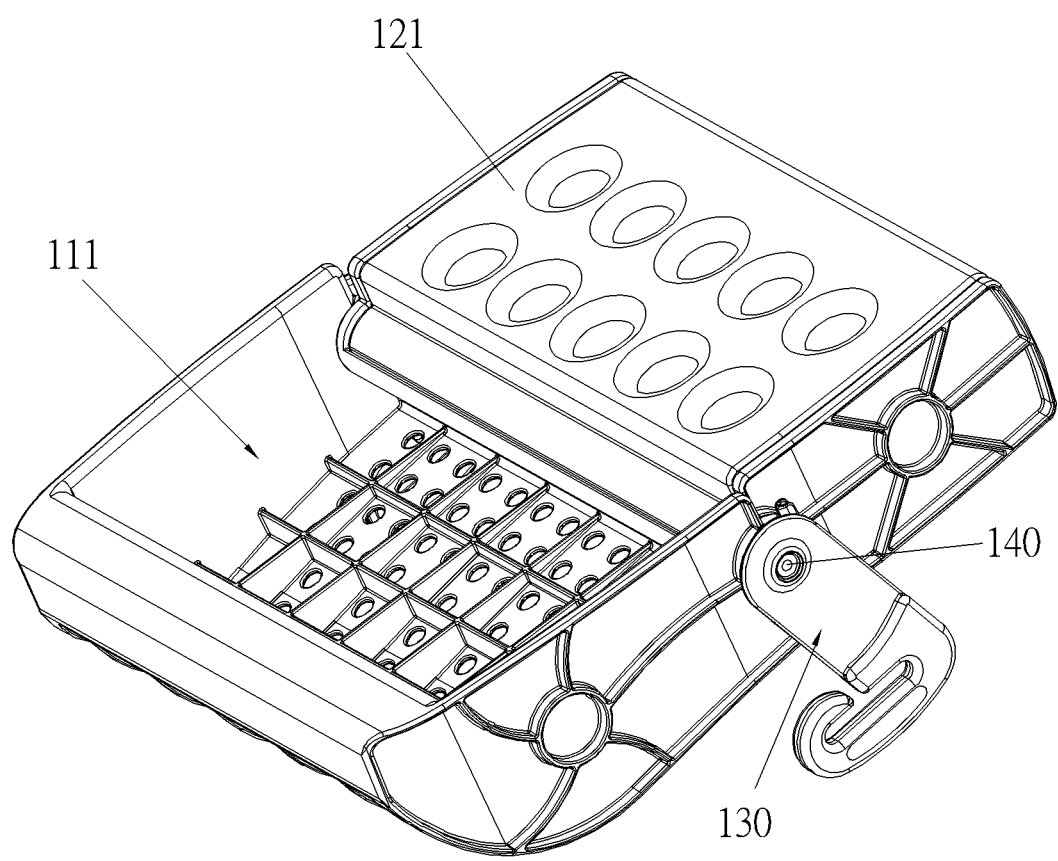
Figure 5:
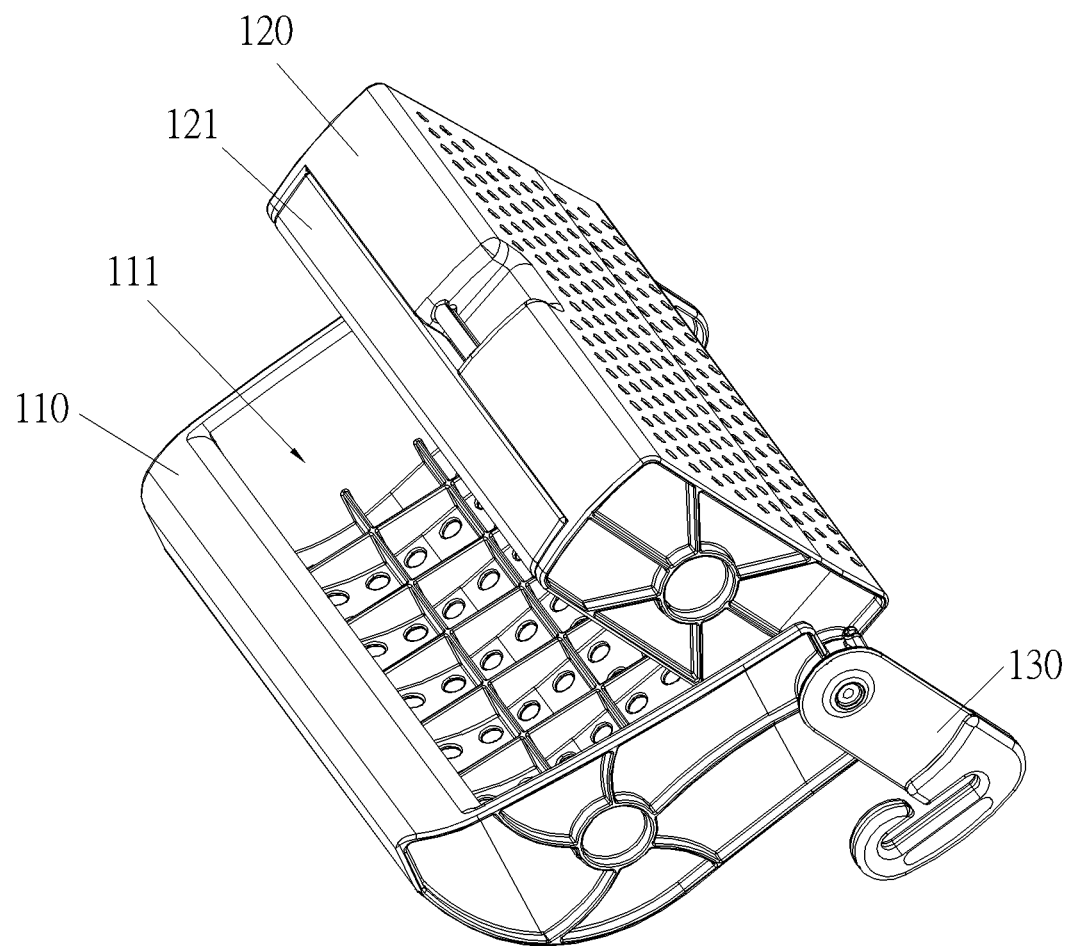
FIG. 5 is a schematic diagram of the adjustable child device in a state between the unfolded state and a folded state according to the first embodiment of the present invention.
Figure 6:
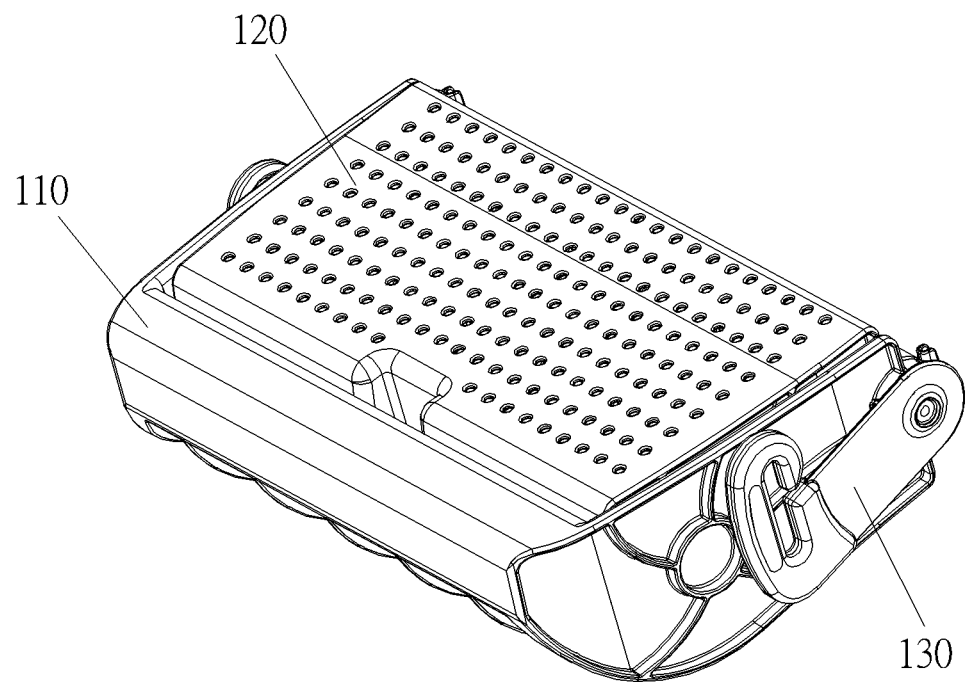
FIG. 6 is a schematic diagram of the adjustable child device in the folded state according to the first embodiment of the present invention.

Please refer to FIG. 1, FIG. 2, FIG. 5 and FIG. 6. FIG. 1 and FIG. 2 are schematic diagrams of an adjustable child device 100 in an unfolded state at different views according to a first embodiment of the present invention. FIG. 5 is a diagram of the adjustable child device 100 in a state between the unfolded state and a folded state according to the first embodiment of the present invention. FIG. 6 is a schematic diagram of the adjustable child device 100 in the folded state according to the first embodiment of the present invention. The adjustable child device 100 includes a first seat portion 110, a second seat portion 120 and two belt engaging elements 130. The first seat portion 110 and the second seat portion 120 are pivoted to each other. A chamber 111 is formed within the first seat portion 110. The second seat portion 120 is at least partially received in the chamber 111 when the second seat portion 120 is pivotally folded relative to the first seat portion 110 to a folded position. The second seat portion 120 and the first seat portion 110 are located on a horizontal plane to form a seat part 18 when the second seat portion 120 is pivotally unfolded relative to the first seat portion 110 to an unfolded position. The two belt engaging elements 130 are installed on two lateral sides of the seat part 18.

Specifically, as shown in FIG. 1 and FIG. 2, the adjustable child device 100 further includes a pivoting shaft 140. A rear end of the first seat portion 110 is pivoted to a front end of the second seat portion 120 by the pivoting shaft 140. A top of the first seat portion 110 and a top of the second seat portion 120 form the seat part 18, which allows a child to sit thereon, when the second seat portion 120 is pivotally unfolded relative to the first seat portion 110 to the unfolded position. In this embodiment, in order to ensure ventilation of the seat part 18, a plurality of ventilation openings can be formed on the top of the first seat portion 110 and the top of the second seat portion 120. Furthermore, in order to improving sitting comfort, the adjustable child device 100 can further include a supporting component 121 which is made of soft material and disposed on a bottom of the second seat portion 120, as shown in FIG. 2 and FIG. 5.

As shown in FIG. 1 and FIG. 2, the two belt engaging elements 130 are rotatably connected to the two lateral sides of the seat part 18, i.e., two lateral sides of the first seat portion 110 or the second seat portion 120 where the first seat portion 110 and the second seat portion 120 are pivoted to each other. When the second seat portion 120 is pivotally unfolded relative to the first seat portion 110 to the unfolded position, the two belt engaging elements 130 can be rotated to be located at upright positions relative to the first seat portion 110. At this moment, the adjustable child device 100 is in the unfolded state, as shown in FIG. 1. When the second seat portion 120 is pivotally folded relative to the first seat portion 110 to the folded position, the two belt engaging elements 130 can be rotated to be located at horizontal positions relative to the first seat portion 110, so as not to protrude from a top of the seat part 18. At this moment, the adjustable child device 100 is in the folded state, as shown in FIG. 1. Furthermore, in this embodiment, the two belt engaging elements 130 can be pivoted to the two lateral sides of the seat part 18 by the pivoting shaft 140. However, it is not limited to this embodiment. For example, in another embodiment, the belt engaging element 130 also can be pivoted to the lateral side of the seat part 18 by a shaft pin other than the pivoting shaft 140, i.e., the belt engaging element 130 can be pivoted to a location other than a pivoting connection of the first seat portion 110 and the second seat portion 120 by the shaft pin. It depends on practical demands.

Figure 3:
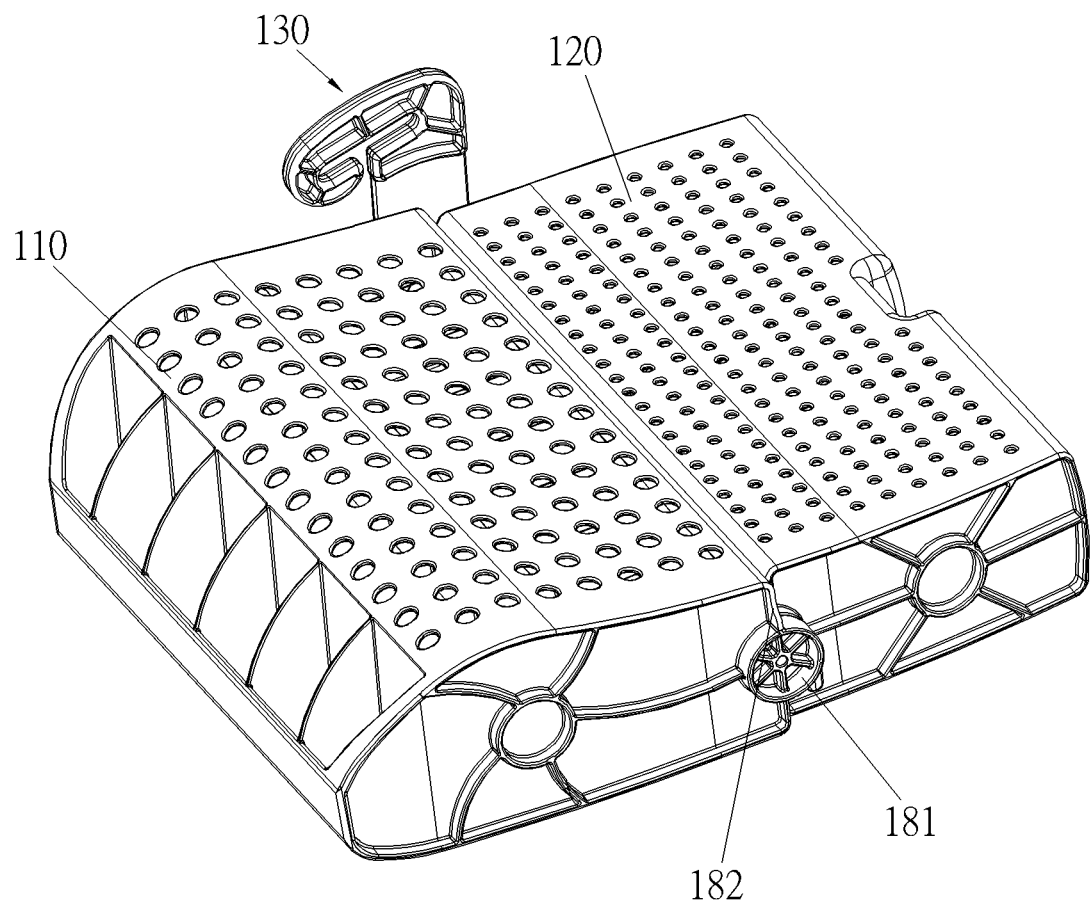
FIG. 3 is a partial diagram of the adjustable child device in the unfolded state according to the first embodiment of the present invention.
Figure 4:
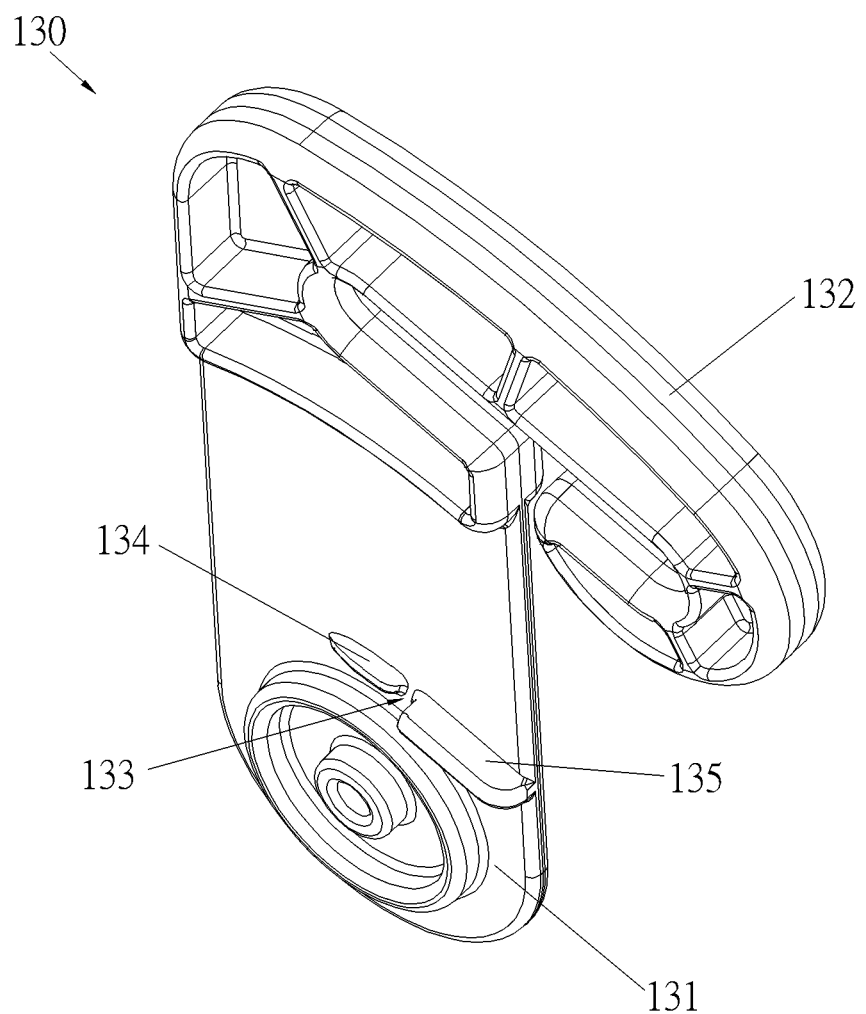
FIG. 4 is a schematic diagram of a belt engaging element of the adjustable child device according to the first embodiment of the present invention.

Please refer to FIG. 1 to FIG. 4. FIG. 3 is a partial diagram of the adjustable child device 100 in the unfolded state according to the first embodiment of the present invention. FIG. 4 is a schematic diagram of the belt engaging element 130 of the adjustable child device 100 according to the first embodiment of the present invention. As shown in FIG. 1 to FIG. 3, the adjustable child device 100 further includes two mounting hubs 181 formed on the two lateral sides of the seat part 18 for assembling with the two belt engaging elements 130. A mounting hole is formed on a center portion of each of the two mounting hubs 181 for allowing the pivoting shaft 140 or the shaft pin to pass therethrough. In such a way, the belt engaging element 130 can be connected to the corresponding mounting hub 181 by the pivoting shaft 140 or the shaft pin. Furthermore, a positioning protrusion 182 is formed on each of the two lateral side of the seat part 18 and adjacent to the corresponding mounting hub 181. Optionally, the positioning protrusion 182 can be a rib, and an extending direction of the positioning protrusion 182 can be parallel to a vertical direction.

As shown in FIG. 4, each of the two belt engaging elements 130 includes a mounting portion 131 and a hook portion 132. A positioning recess 133 is formed on the mounting portion 131 of the belt engaging element 130 and located at a position corresponding to the positioning protrusion 182. Specifically, in this embodiment, the positioning recess 133 can be formed between a first protruding portion 134 and a second protruding portion 135 formed on the mounting portion 131 of the belt engaging element 130 and spaced apart from each other. Furthermore, the first protruding portion 134 and the second protruding portion 135 can extend along a horizontal direction. The first protruding portion 134 and the second protruding portion 135 are located at two opposite sides of the positioning protrusion 182 when the positioning protrusion 182 engages with the positioning recess 133. Preferably, a height of the first protruding portion 134 can be less than a height of the second protruding portion 135. In such a way, when the belt engaging element 130 is rotated to be folded, the applied force needs to overcome constraint between the first protruding portion 134 and the positioning protrusion 182 so that the positioning protrusion 182 can be disengaged from the positioning recess 133 by crossing over the first protruding portion 134, and the second protruding portion 135 stops the belt engaging element 130 and prevents excessive rearward rotation of the belt engaging element 130 when the belt engaging element 130 is located at the unfolded position, i.e., the upright position.

As shown in FIG. 1 to FIG. 6, operational principle of the adjustable child device 100 is described as follows. When the adjustable child device 100 is in the unfolded state, the second seat portion 120 is pivotally unfolded relative to the first seat portion 110 to the unfolded position to form the seat part 18, and the two belt engaging elements 130 are operated to be located at the upright positions to protrude from the seat part 18. At this moment, each of the two positioning protrusions 182 on the seat part 18 engages with the positioning recess 133 on the corresponding belt engaging element 130, as shown in FIG. 1. When it is desired to fold the adjustable child device 100 from the unfolded state to the folded state, the second seat portion 120 can be operated to pivotally fold relative to the first seat portion 110 to be received in the chamber 111 on the first seat portion 110. Furthermore, the two belt engaging elements 130 can be operated to rotate to the horizontal positions relative to the first seat portion 110 by disengagement of the two positioning protrusions 182 and the two positioning recesses 133 by the applied force capable of overcoming the constraint between the two first protruding portions 134 and the two positioning protrusions 182, as shown in FIG. 6. Therefore, the adjustable child device 100 not only saves storage space but also improves safety because the second seat portion 120 is received in the chamber 111 and the two belt engaging elements 130 do not protrude from the first seat portion 110 and the second seat portion 120.

Figure 7:
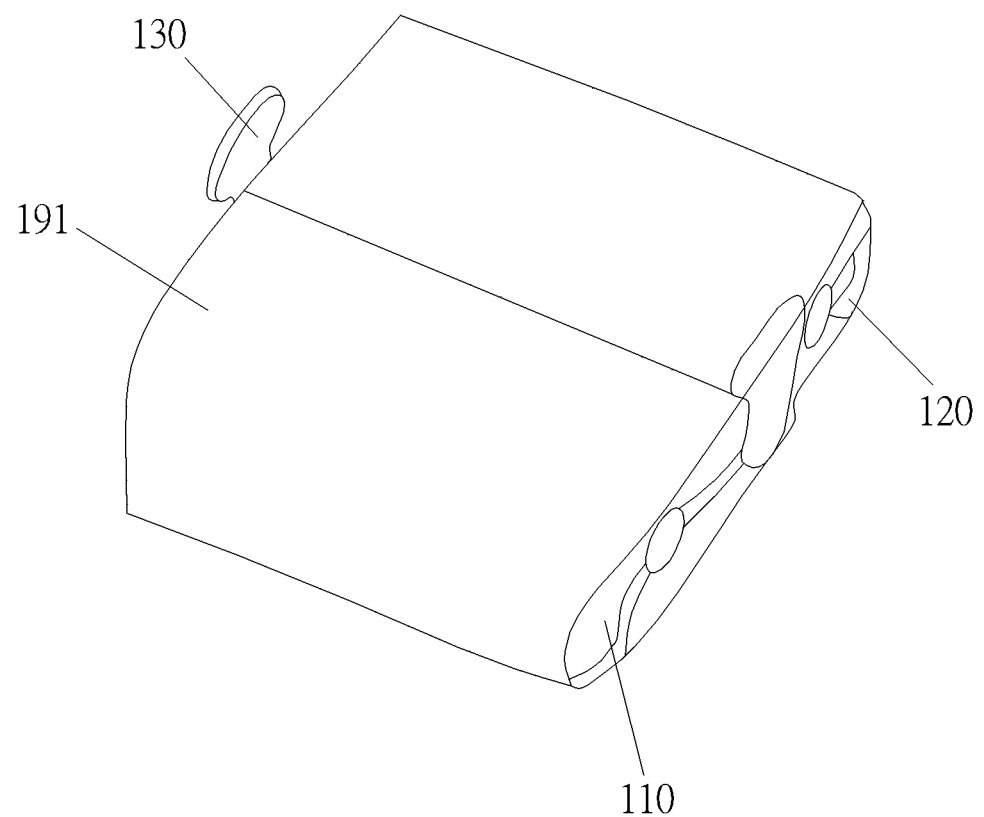
FIG. 7 to FIG. 9 are diagrams of an adjustable child device according to other embodiments of the present invention.
Figure 8:
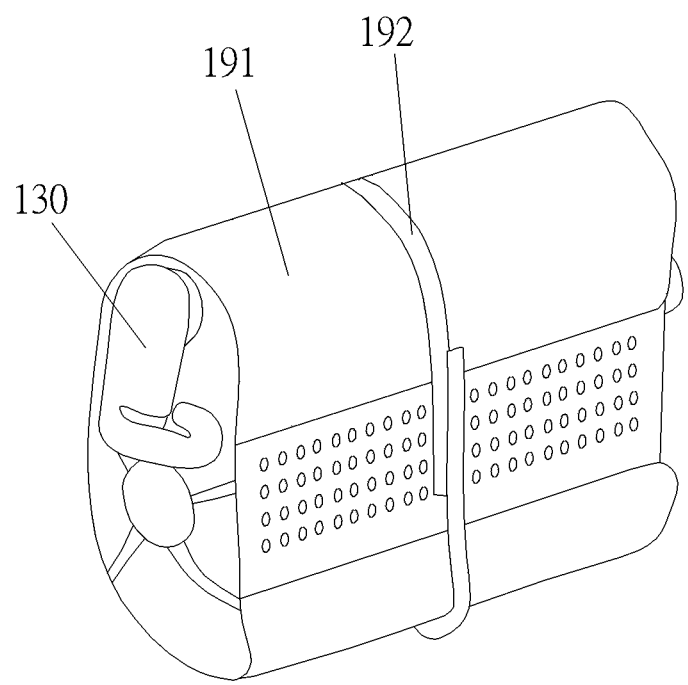
Figure 9:
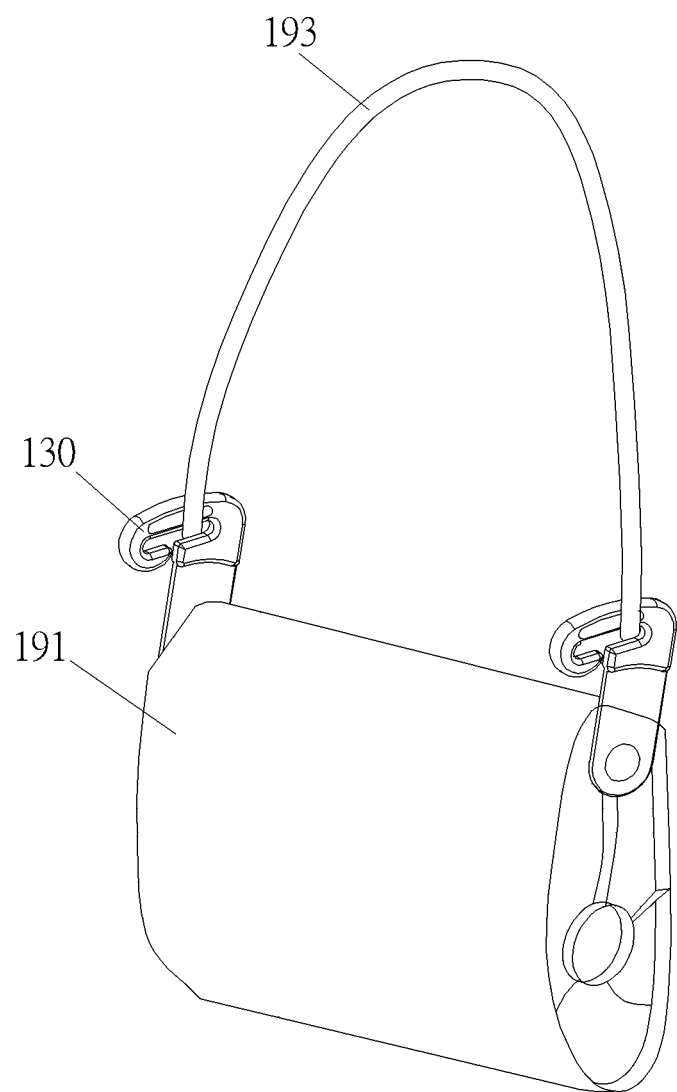

Please refer to FIG. 7 to FIG. 9. FIG. 7 to FIG. 9 are diagrams of an adjustable child device according to other embodiments of the present invention. For example, as shown in FIG. 7, in this embodiment, the adjustable child device can further include a soft cloth 191 or another mat component covering the first seat portion 110 and the second seat portion 120, so as to improve sitting comfort or aesthetic appearance. Furthermore, as shown in FIG. 8, in this embodiment, the adjustable child device can further include a tie-down strap 192 for fastening the first seat portion 110 and the second seat portion 120 when the second seat portion 120 is located at the folded position relative to the first seat portion 110. Besides, as shown in FIG. 9, in this embodiment, the adjustable child device can further include a hanging strap 193. The hanging strap 193 is for connecting the two belt engaging elements 130 located at upright positions when the second seat portion 120 is located at the folded position relative to the first seat portion 110, which brings convenience of carrying for a user.

Figure 10:
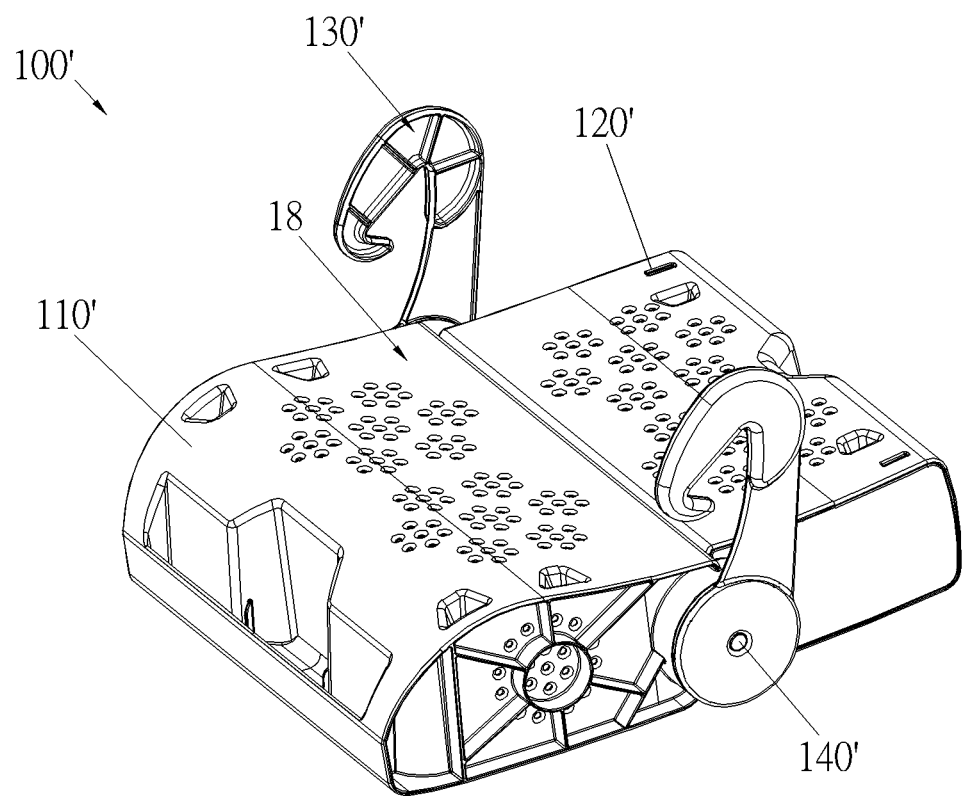
FIG. 10 is a schematic diagram of an adjustable child device in an unfolded state according to a second embodiment of the present invention.
Figure 11:
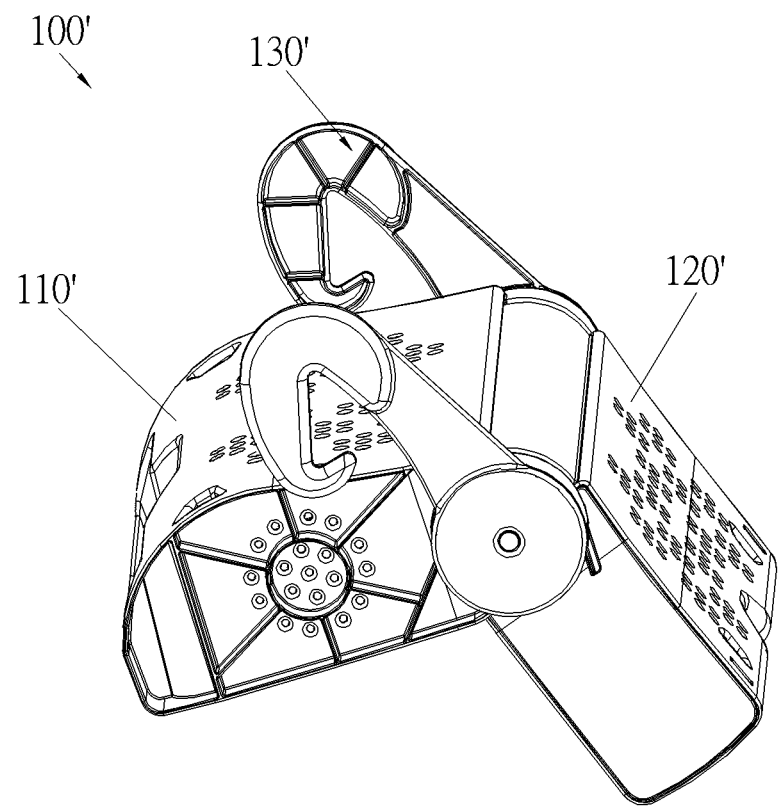
FIG. 11 is a schematic diagram of the adjustable child device in a state between the unfolded state and a folded state according to the second embodiment of the present invention.
Figure 12:
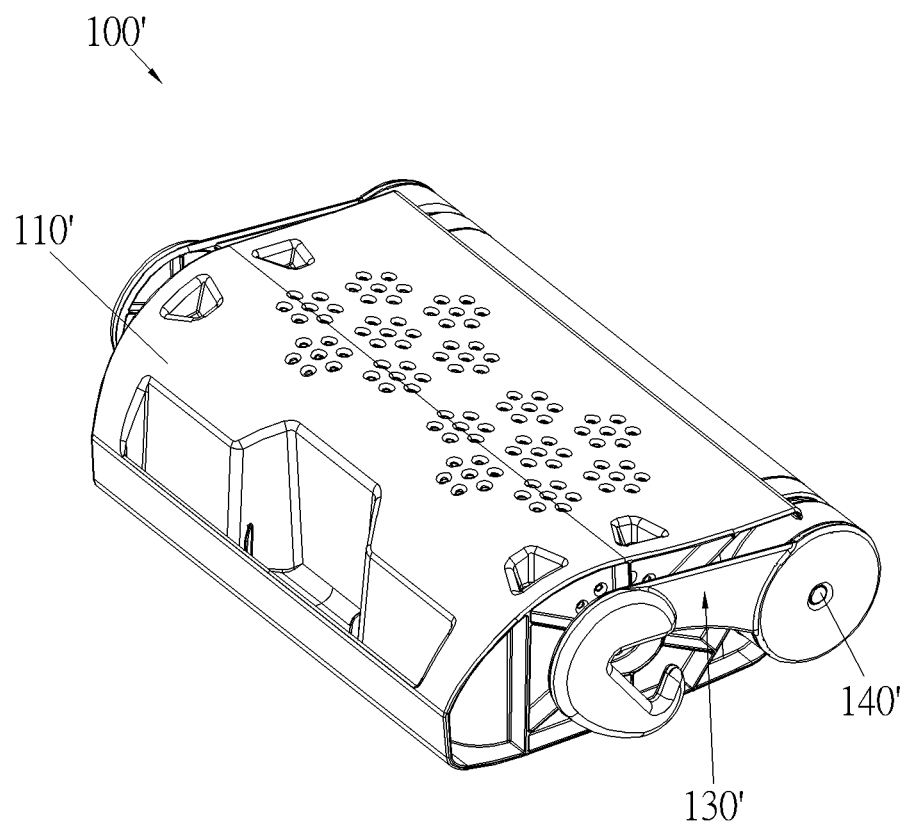
FIG. 12 is a schematic diagram of the adjustable child device in the folded state according to the second embodiment of the present invention.

Please refer to FIG. 10 to FIG. 12. FIG. 10 is a schematic diagram of an adjustable child device 100' in an unfolded state according to a second embodiment of the present invention. FIG. 11 is a schematic diagram of the adjustable child device 100' in a state between the unfolded state and a folded state according to the second embodiment of the present invention. FIG. 12 is a schematic diagram of the adjustable child device 100' in the folded state according to the second embodiment of the present invention. In this embodiment, elements that have the similar structures and functions as that illustrated in the aforementioned embodiment are provided with the similar item numbers. As shown in FIG. 10 to FIG. 12, a rear end of a first seat portion 110' is pivoted to a front end of a second seat portion 120' by a pivoting shaft 140'. Two belt engaging elements 130' are rotatably connected to the two lateral sides of the seat part 18 by the pivoting shaft 140'. However, different from the first embodiment, in this embodiment, the rear end of the first seat portion 110' is installed on the front end of the second seat portion 120', and the two belt engaging elements 130' is embedded into the rear end of the first seat portion 110', so that the two belt engaging elements 130' can be driven to fold or unfold by folding or unfolding the second seat portion 120' relative to the first seat portion 110'. In other words, in this embodiment, the belt engaging element 130' can be driven to fold or unfold between a stowed position and a use position automatically when the second seat portion 120' is operated to fold or unfold relative to the first seat portion 110' between the folded position and the unfolded portion.

Figure 13A:
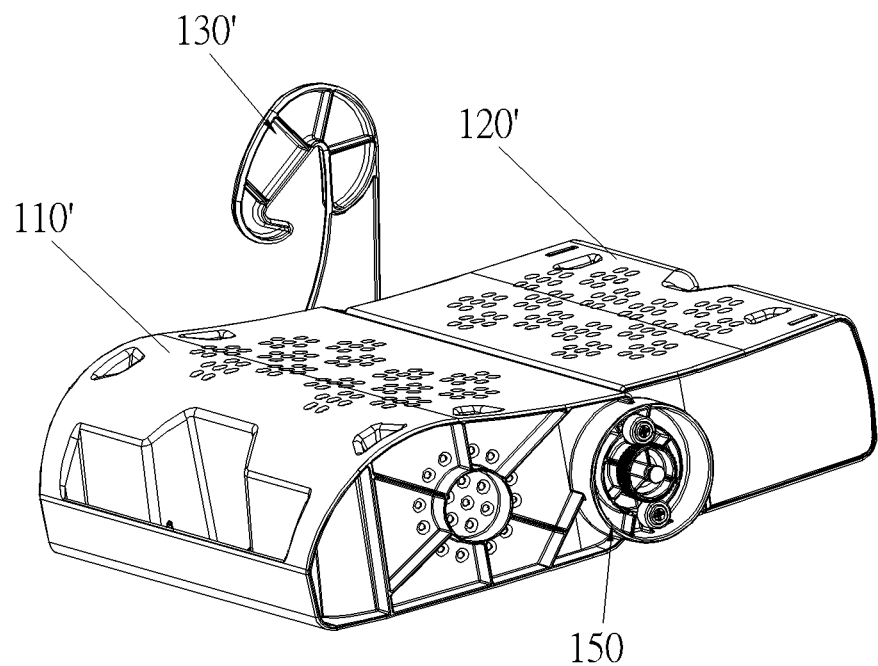
FIG. 13A is a partial diagram of the adjustable child device in the unfolded state according to the second embodiment of the present invention.
Figure 13B:
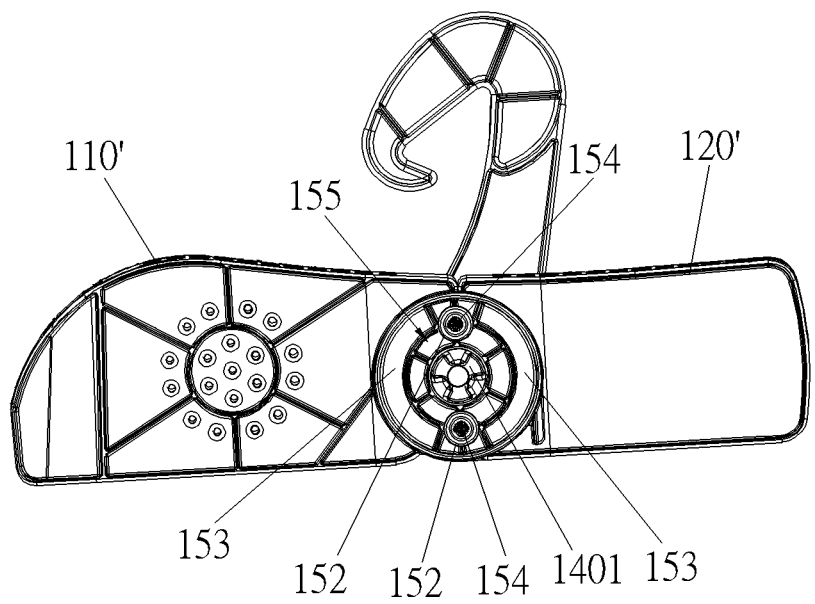
FIG. 13B is a partial lateral diagram of the adjustable child device according to the second embodiment of the present invention.
Figure 14:
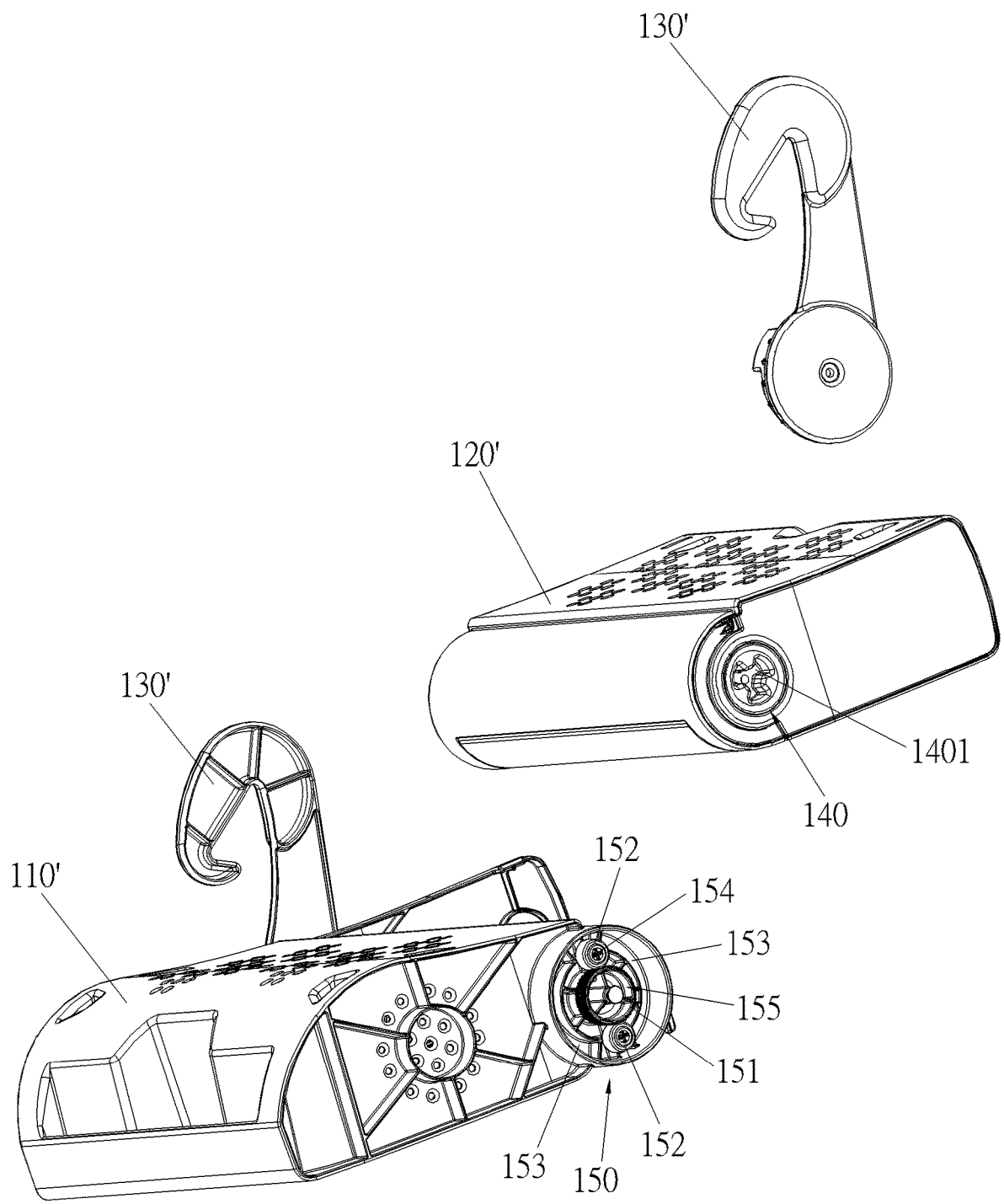
FIG. 14 is a partial exploded diagram of the adjustable child device in the unfolded state according to the second embodiment of the present invention.

Specifically, please refer to FIG. 13A to FIG. 14. FIG. 13A is a partial diagram of the adjustable child device 100' in the unfolded state according to the second embodiment of the present invention. FIG. 13B is a partial lateral diagram of the adjustable child device 100' according to the second embodiment of the present invention. FIG. 14 is a partial exploded diagram of the adjustable child device 100' in the unfolded state according to the second embodiment of the present invention. As shown in FIG. 13A to FIG. 14, the first seat portion 110' includes two first connecting assemblies 150. Each of the two first connecting assemblies 150 is connected to the front end of the second seat portion 120' and the corresponding belt engaging element 130'. Each of the two first connecting assemblies 150 includes a central through hole part 155, a gear 151, two receiving slot parts 153 and two driven wheels 152. The gear 151 is disposed on the central through hole part 155 and connected to the front end of the second seat portion 120'. The two receiving slot parts 153 are located outside the gear 151. An outer periphery of each of the two driven wheels 152 interferes with an outer periphery of the gear 151. Preferably, in this embodiment, an outline of the first connecting assembly 150 can be formed in a circular shape. The gear 151 can be located at a center portion of the first connecting assembly 150. Centers of the two driven wheels 152 and of the gear 151 can be aligned on the same line. The two receiving slot parts 153 can be formed in arc shapes and located between the two driven wheels 152. However, the numbers of the driven wheel 152 and the receiving slot part 153 are not limited to this embodiment. For example, the first connecting assembly 150 also can include one driven wheel 152 and one receiving slot part 153 only. It depends on practical demands.

Figure 15:
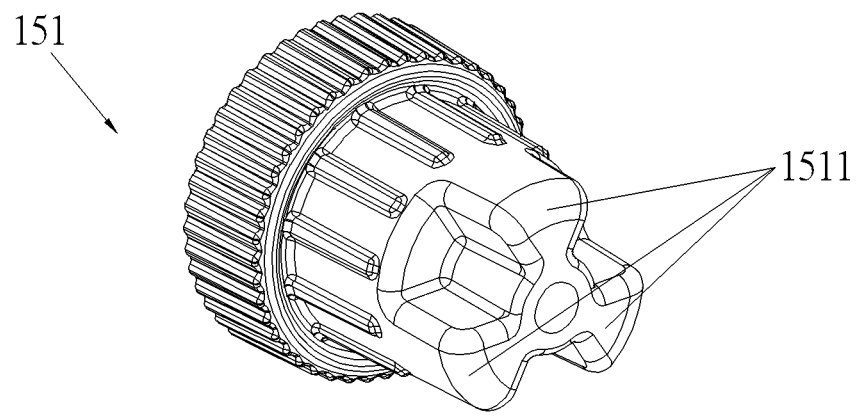
FIG. 15 is a diagram of a gear of the adjustable child device according to the second embodiment of the present invention.

Please further refer to FIG. 15. FIG. 15 is a diagram of the gear 151 of the adjustable child device 100' according to the second embodiment of the present invention. As shown in FIG. 15, a fixing protrusion 1511 is formed on an end of the gear 151, and the second seat portion 120' further includes a second connecting assembly 140 for engaging with the gear 151. Specifically, in this embodiment, a fixing recess 1401 is formed on the second connecting assembly 140, as shown in FIG. 14. By engagement of the fixing protrusion 1511 and the fixing recess 1401, the gear 151 can be fixed onto the second seat portion 120'. Furthermore, the two driven wheels 152 are rotatably installed on two fixing columns 154, so as to rotate relative to the second seat portion 120'. Interference between the driven wheels 152 and the gear 151 increases a frictional force of relative rotation of the driven wheels 152 and the gear 151.

Figure 16:
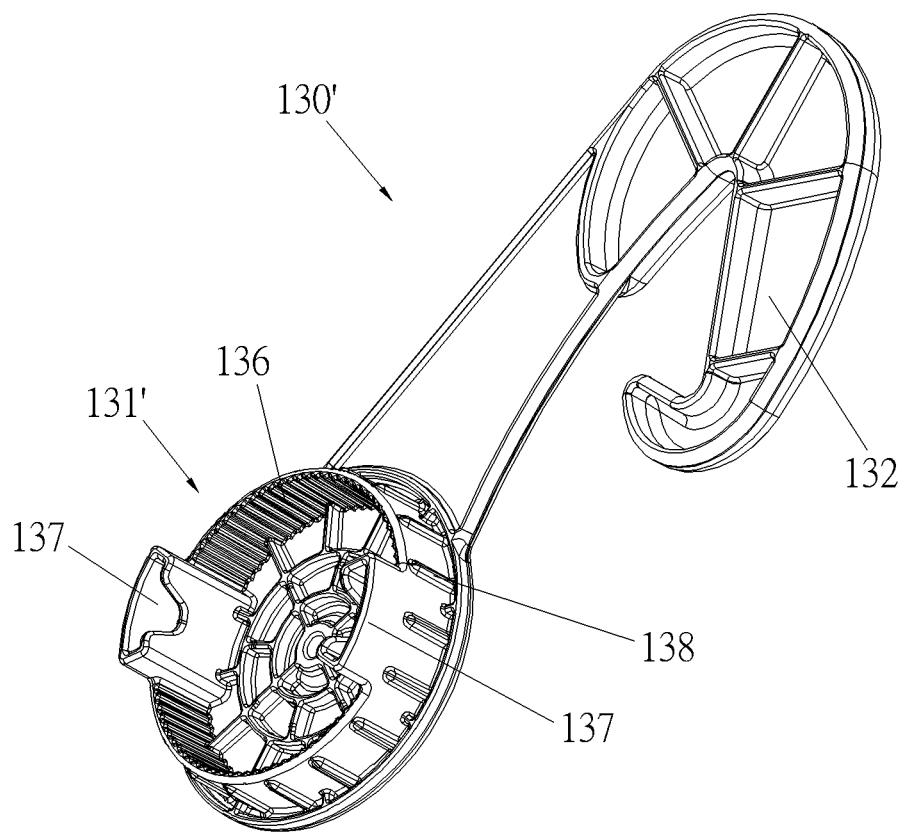
FIG. 16 is a diagram of a belt engaging element of the adjustable child device according to the second embodiment of the present invention.

Please refer to FIG. 16. FIG. 16 is a diagram of the belt engaging element 130' of the adjustable child device 100' according to the second embodiment of the present invention. As shown in FIG. 16, each of the two belt engaging elements 130' includes a mounting portion 131', an inner gear 136, and a plurality of ribs 138. An outline of the mounting portion 131' can be formed in a circular shape corresponding to the first connecting assembly 150. The plurality of ribs 138 interferes with the periphery of the first connecting assembly 150. A side wall of the mounting portion 131' is received in the two receiving slot parts 153, and the inner gear 136 is disposed on an inner periphery of the mounting portion 131' for interfering with the outer peripheries of the two driven wheels 152. In other words, when the first seat portion 110', the second seat portion 120', and the belt engaging element 130' are movably connected to one another, the outer periphery of the gear 151 interferes with the outer peripheries of the two driven wheels 152, and the outer peripheries of the two driven wheels 152 interfere with the inner gear 136 of the belt engaging element 130', which increases a frictional force of rotation. When the second seat portion 120' is folded or unfolded relative to the first seat portion 110', the gear 151 is driven to rotate, so that each of the two belt engaging elements 130' can be folded or unfolded automatically by interference between the gear 151 and the two driven wheels 152 and between the two driven wheels 152 and the inner gear 136.

Furthermore, two restraining protrusions 137 are formed on the side wall of the mounting portion 131' and movable received within the two receiving slot parts 153. Specifically, the two restraining protrusions 137 move along with the belt engaging element 130' when the belt engaging element 130' moves relative to the seat part 18. Preferably, a moving route of each of the two restraining protrusions 137 can be formed in an arc shape, and a moving range of the moving route can be equal to or less than 90 degrees, which allows the belt engaging element 130' to be rotated to a desired position manually.

Figure 17A:
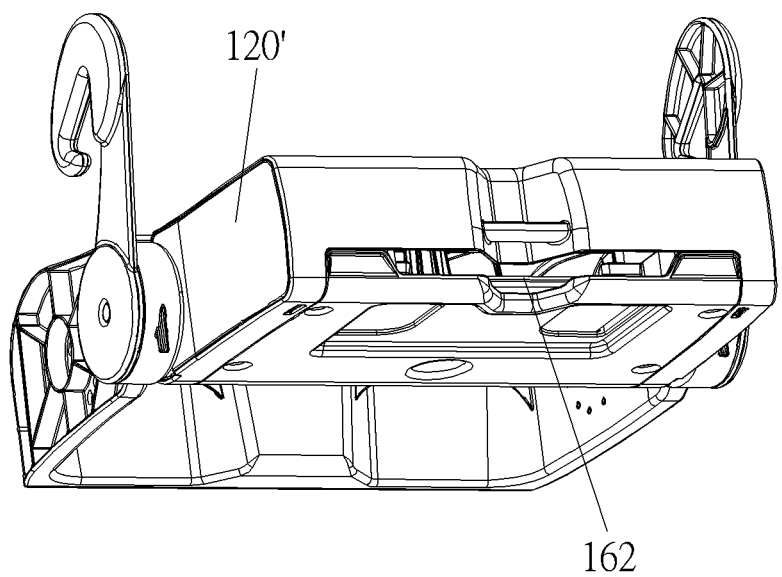
FIG. 17A and FIG. 17B are partial diagrams of the adjustable child device in the unfolded state at different views according to the second embodiment of the present invention.
Figure 17B:
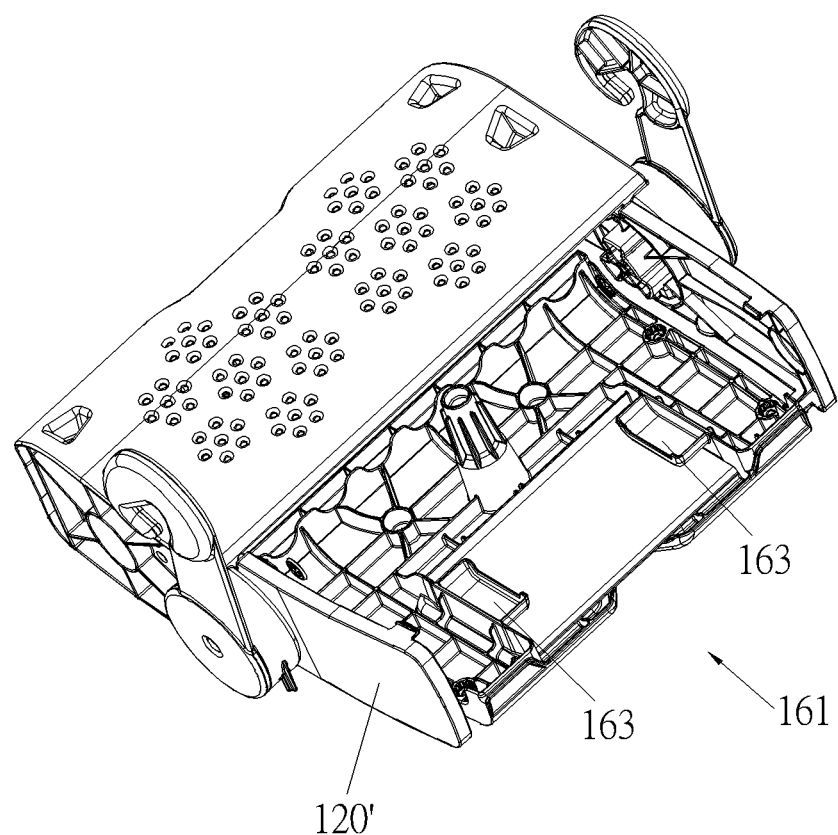

Please refer to FIG. 17A and FIG. 17B. FIG. 17A and FIG. 17B are partial diagrams of the adjustable child device 100' in the unfolded state at different views according to the second embodiment of the present invention. As shown in FIG. 17A and FIG. 17B, an accommodating space 161 is formed on the second seat portion 120' for accommodating an instruction manual 162 of the adjustable child seat 100'.

The second seat portion 120' can further include two restraining blocks 163 disposed on two sides of a lower part of the second seat portion 120' for restraining the instruction manual 162.

Figure 18:
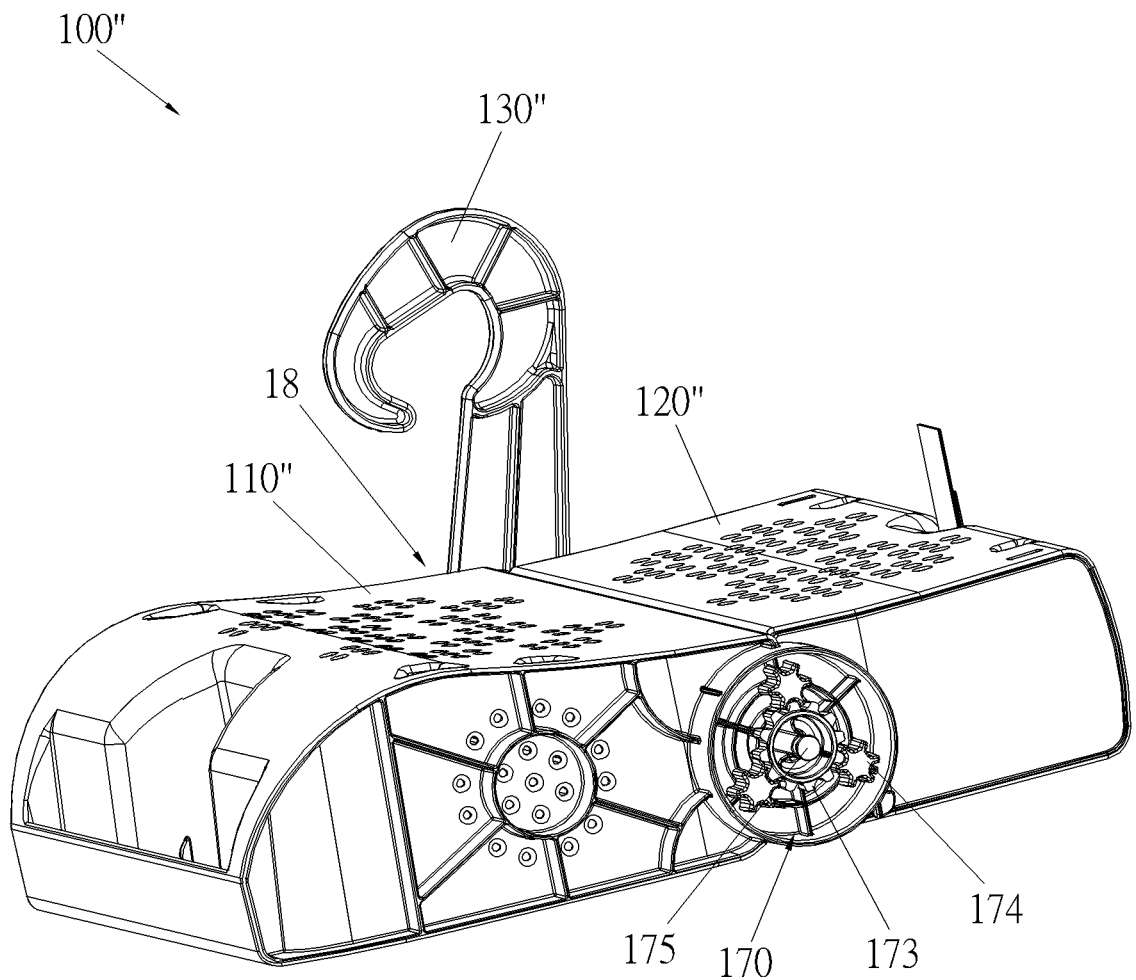
FIG. 18 is a partial diagram of an adjustable child device in an unfolded state according to a third embodiment of the present invention.
Figure 19:
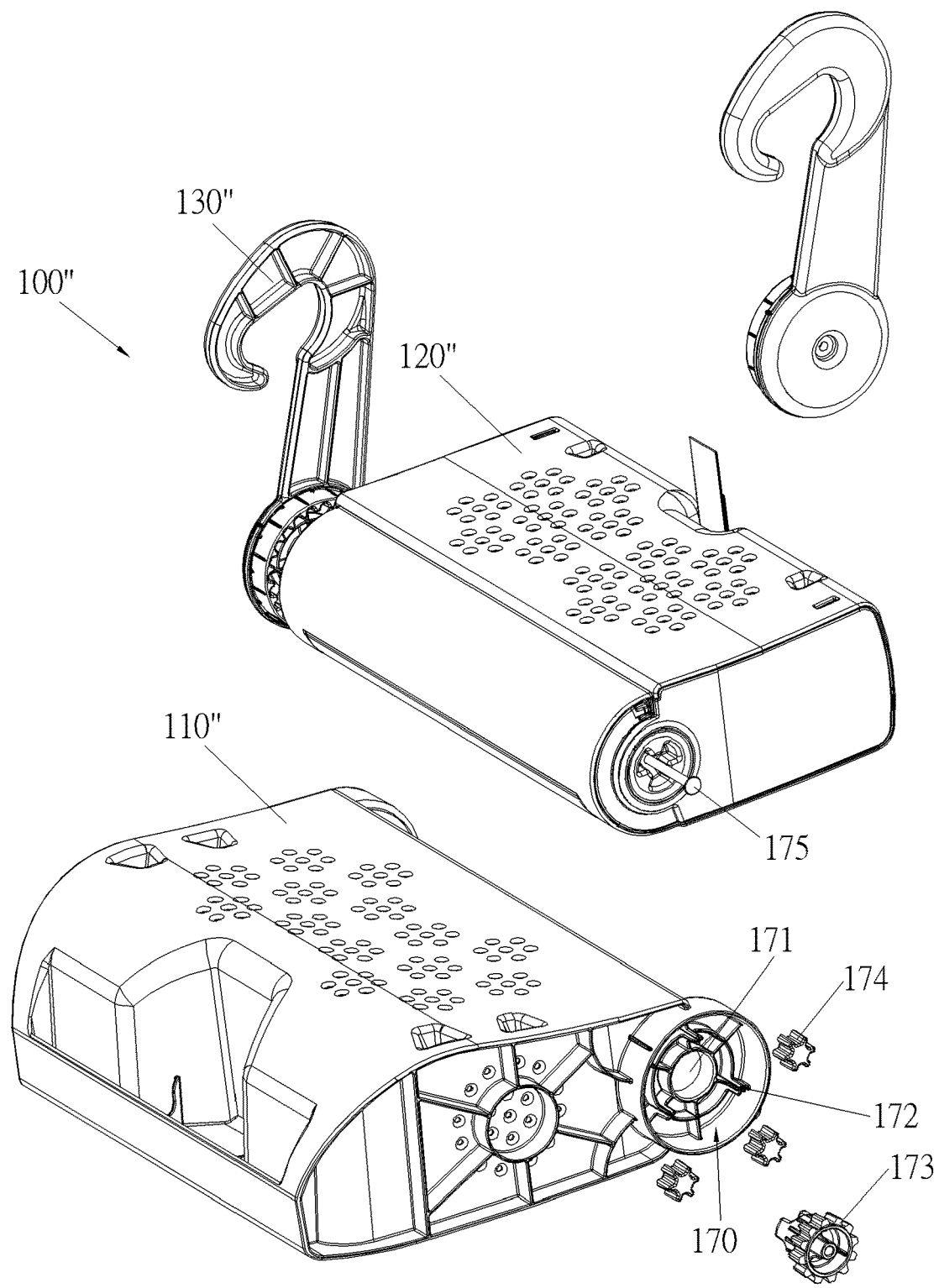
FIG. 19 is a partial exploded diagram of the adjustable child device in the unfolded state according to the third embodiment of the present invention.
Figure 20:
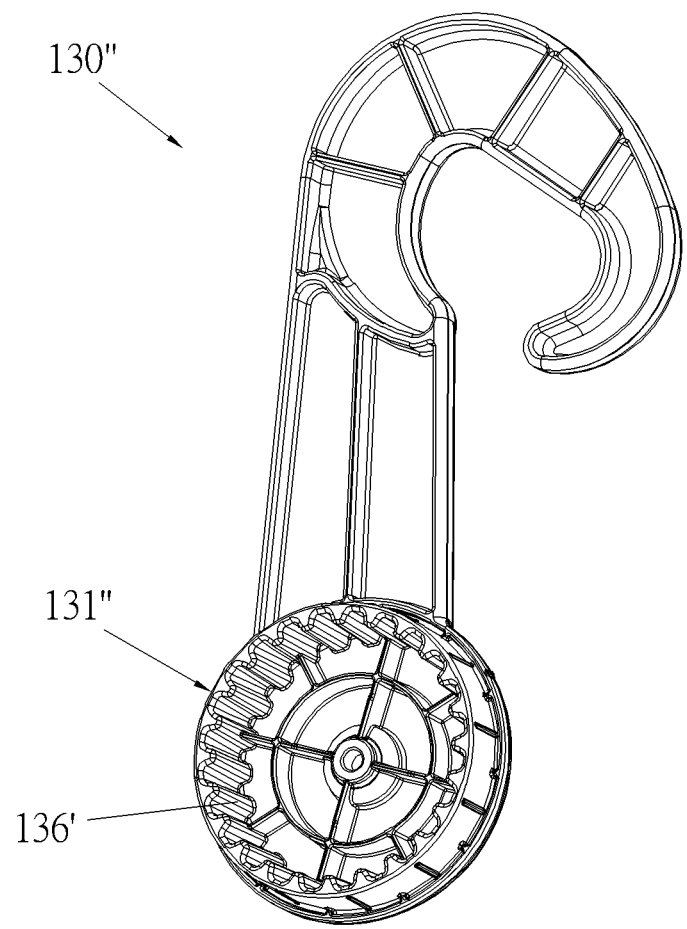
FIG. 20 is a diagram of a belt engaging element of the adjustable child device according to the third embodiment of the present invention.

Please refer to FIG. 18 to FIG. 20. FIG. 18 is a partial diagram of an adjustable child device 100" in an unfolded state according to a third embodiment of the present invention. FIG. 19 is a partial exploded diagram of the adjustable child device 100" in the unfolded state according to the third embodiment of the present invention. FIG. 20 is a diagram of a belt engaging element 130" of the adjustable child device 100" according to the third embodiment of the present invention. In this embodiment, elements that have the similar structures and functions as that illustrated in the aforementioned embodiment are provided with the similar item numbers. As shown in FIG. 18 to FIG. 20, a rear end of a first seat portion 110" is pivoted to a front end of a second seat portion 120" by a pivoting shaft 175. The two belt engaging elements 130" are rotatably connected to the two lateral sides of the seat part 18 by the pivoting shaft 175. In this embodiment, the two belt engaging elements 130" also can be driven to fold or unfold between the stowed position and the use position automatically by folding or unfolding the second seat portion 120" relative to the first seat portion 110" between the folded position and the unfolded portion.

However, different from the second embodiment, in this embodiment, the first seat portion 110" includes two first connecting assemblies 170. Each of the two first connecting assemblies 170 includes a sun gear 173 and three planetary gears 174. The sun gear 173 is connected to the front end of the second seat portion 120". The three planetary gears 174 engage with the sun gear 173. Specifically, the first connecting assembly 170 further includes a central through hole part 171 and three rib seats 172. The sun gear 173 passes through the central through hole part 171 and is installed on the second seat portion 120" by the pivoting shaft 175. The three rib seats 172 are disposed around the central through hole part 171. The three planetary gears 174 are installed on the three rib seats 172. Preferably, in this embodiment, the three planetary gears 174 can disposed on an outer periphery of the sun gear 173 at intervals for engaging with the sun gear 173. However, the numbers of the planetary gear 174 and the rib seat 172 are not limited to this embodiment. For example, in another embodiment, the first connecting assembly 170 also can include six rib seats 172 and six planetary gears 174. It depends on practical demands.

As shown in FIG. 20, each of the two belt engaging elements 130" includes a mounting portion 131" and a ring gear 136'. The mounting portion 131" is connected to the first connecting assembly 170. The ring gear 136' is disposed on an inner periphery of the mounting portion 131". When the mounting portion 131" is installed on the first connecting assembly 170 by the pivoting shaft 175, the ring gear 136' engages with the three planetary gears 174. In other words, when the first seat portion 110", the second seat portion 120", and the belt engaging element 130" are movably connected to one another, an outer periphery of the sun gear 173 engages with outer peripheries of the three planetary gears 174, and the outer peripheries of the three planetary gears 174 engage with the ring gear 136' of the belt engaging element 130". In such a way, when the second seat portion 120" is folded or unfolded relative to the first seat portion 110", the sun gear 173 is driven to rotate, so that each of the two belt engaging elements 130" can be folded or unfolded by interference between the sun gear 173 and the three planetary gears 174 and between the three planetary gears 174 and the ring gear 136'.

In contrast to the prior art, the present invention utilizes the first seat portion, the second seat portion and the belt engaging element pivoted to one another, so that the second seat portion and the belt engaging element can be folded relative to the first seat portion when the adjustable child device is not in use. Therefore, the adjustable child device has a small storage size, which saves storage space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable child device comprising:
   a first seat portion, a chamber being formed within the first seat portion;
   a second seat portion foldable relative to the first seat portion, the second seat portion being at least partially received in the chamber when the second seat portion is folded relative to the first seat portion to a folded position, and the second seat portion and the first seat portion being located on a horizontal plane to form a seat part when the second seat portion is unfolded relative to the first seat portion to an unfolded position; and
   a belt engaging element installed on a lateral side of the seat part, the belt engaging element concurrently rotating from a stowed position to a use position when the second seat portion is unfolded relative to the first seat portion from the folded position to the unfolded position.

2. The adjustable child device of claim 1, further comprising a mounting hub formed on the lateral side of the seat part and a shaft pin, and the belt engaging element being connected to the mounting hub by the shaft pin.

3. The adjustable child device of claim 1, further comprising a supporting component disposed on a bottom of the second seat portion, and the supporting component being made of soft material.

4. The adjustable child device of claim 1, further comprising a soft cloth covering the first seat portion and the second seat portion.

5. The adjustable child device of claim 1, further comprising a tie-down strap for fastening the first seat portion and the second seat portion when the second seat portion is at the folded position.

6. The adjustable child device of claim 1, wherein a plurality of ventilation openings is formed on a top of the first seat portion and a top of the second seat portion.

7. The adjustable child device of claim 1, further comprising a pivoting shaft, a rear end of the first seat portion being pivoted to a front end of the second seat portion by the pivoting shaft, and the belt engaging element being rotatably connected to the lateral side of the seat part by the pivoting shaft.

8. The adjustable child device of claim 1, wherein the first seat portion comprises a first connecting assembly, the first connecting assembly comprises a central through hole part, a gear, at least one receiving slot part and at least one driven wheel, the gear is disposed on the central through hole part and connected to the front end of the second seat portion, the at least one receiving slot part is located outside the gear, and an outer periphery of the at least one driven wheel interferes with an outer periphery of the gear.

9. The adjustable child device of claim 8, wherein the belt engaging element comprises a mounting portion and an inner gear, the mounting portion is connected to the first connecting assembly, a periphery of the mounting portion is received in the at least one receiving slot part, and the inner gear is disposed on an inner periphery of the mounting portion for interfering with the outer periphery of the at least one driven wheel.

10. The adjustable child device of claim 9, wherein at least one restraining protrusion is formed on the mounting portion and movably received within the at least one receiving slot part.

11. The adjustable child device of claim 10, wherein a moving route of the at least one restraining protrusion is formed in an arc shape, and a moving range of the moving route is equal to or less than 90 degrees.

12. The adjustable child device of claim 8, wherein the second seat portion comprises a second connecting assembly fixedly connected to the gear.

13. The adjustable child device of claim 12, wherein a fixing recess is formed on the second connecting assembly, and a fixing protrusion is formed on an end of the gear for engaging with the fixing recess.

14. An adjustable child device comprising:
a first seat portion comprising a first connecting assembly, the first connecting assembly comprising a central through hole part, a gear, at least one receiving slot part and at least one driven wheel, the at least one receiving slot part being located outside the gear, and an outer periphery of the at least one driven wheel interfering with an outer periphery of the gear;
a pivoting shaft;
a second seat portion, a rear end of the first seat portion being pivoted to a front end of the second seat portion by the pivoting shaft, the second seat portion and the first seat portion being located on a horizontal plane to form a seat part when the second seat portion is unfolded relative to the first seat portion to an unfolded position, and the gear being disposed on the central through hole part and connected to the front end of the second seat portion; and
a belt engaging element rotatably connected to a lateral side of the seat part by the pivoting shaft and driven to rotate by a pivoting movement of the second seat portion relative to the first seat portion.

15. The adjustable child device of claim 14, wherein the belt engaging element comprises a mounting portion and an inner gear, the mounting portion is connected to the first connecting assembly, a periphery of the mounting portion is received in the at least one receiving slot part, and the inner gear is disposed on an inner periphery of the mounting portion for interfering with the outer periphery of the at least one driven wheel.

16. The adjustable child device of claim 15, wherein at least one restraining protrusion is formed on the mounting portion and movably received within the at least one receiving slot part.

17. The adjustable child device of claim 16, wherein a moving route of the at least one restraining protrusion is formed in an arc shape, and a moving range of the moving route is equal to or less than 90 degrees.

18. The adjustable child device of claim 14, wherein the second seat portion comprises a second connecting assembly fixedly connected to the gear.

19. The adjustable child device of claim 18, wherein a fixing recess is formed on the second connecting assembly, and a fixing protrusion is formed on an end of the gear for engaging with the fixing recess.

\* \* \* \* \*

UNITED STATES PATENT AND TRADEMARK OFFICE
CERTIFICATE OF CORRECTION

Page 1 of 1

PATENT NO. : 10,632,872 B2
APPLICATION NO. : 16/594068
DATED : April 28, 2020
INVENTOR(S) : Zong-Wang Cui It is certified that error appears in the above-identified patent and that said Letters Patent is hereby corrected as shown below:

On the Title Page

Add:
--(30) Foreign Application Priority Data
Dec. 8, 2016 (CN) .................. 2016 1 1122920
Apr. 27, 2017 (CN) .................. 2017 1 0286557
Sep. 29, 2017 (CN) .................. 2017 1 0912101--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*